United States Patent
Cheng et al.

(10) Patent No.: US 11,690,435 B2
(45) Date of Patent: Jul. 4, 2023

(54) SYSTEM AND METHOD FOR NAVIGATING USER INTERFACES USING A HYBRID TOUCHLESS CONTROL MECHANISM

(71) Applicant: Perfect Mobile Corp., New Taipei (TW)

(72) Inventors: Chou Cheng, Tainan (TW); Chieh-Chung Wu, New Taipei (TW)

(73) Assignee: PERFECT MOBILE CORP., New Taipei (TW)

(*) Notice: Subject to any disclaimer, the term of this patent is extended or adjusted under 35 U.S.C. 154(b) by 14 days.

(21) Appl. No.: 17/366,862

(22) Filed: Jul. 2, 2021

(65) Prior Publication Data

US 2022/0007816 A1    Jan. 13, 2022

Related U.S. Application Data

(60) Provisional application No. 63/048,703, filed on Jul. 7, 2020.

(51) Int. Cl.
*A45D 44/00* (2006.01)
*G06F 3/01* (2006.01)
(Continued)

(52) U.S. Cl.
CPC ............ *A45D 44/005* (2013.01); *G06F 3/011* (2013.01); *G06F 3/017* (2013.01); *G06T 19/20* (2013.01);
(Continued)

(58) Field of Classification Search
CPC .................................................. A45D 44/0005
See application file for complete search history.

(56) References Cited

U.S. PATENT DOCUMENTS 8,384,675 B2   2/2013   Westerman et al.
9,596,319 B2   3/2017   Feldman et al.
(Continued)

FOREIGN PATENT DOCUMENTS

CN    108227922 A    6/2018
CN    111651040 A    9/2020
(Continued)

OTHER PUBLICATIONS

Extended European Search Report dated Jan. 10, 2022, issued in application No. EP 21184851.0.
(Continued)

*Primary Examiner* — James J Debrow
(74) *Attorney, Agent, or Firm* — McClure, Qualey & Rodack, LLP

(57) ABSTRACT

A computing device captures a live video of a user, determines a location of a facial region of the user by a facial region analyzer, and determines a finger vector type by a finger vector detector based on a direction in which at least one finger is pointing relative to the facial region of the user. Responsive to detecting a first finger vector type within the facial region involving a single finger, a makeup effects toolbar is displayed in the user interface. Responsive to detecting a second finger vector type involving the single finger, a selection tool for selecting a makeup effect in the makeup effects toolbar is displayed. The computing device obtains a makeup effect based on manipulation by the user of the selection tool. Responsive to detecting a target user action, virtual application of the selected makeup effect is performed on the facial region of the user.

20 Claims, 12 Drawing Sheets

(51) Int. Cl.
   *G06T 19/20* (2011.01)
   *G06V 20/20* (2022.01)
   *G06V 40/20* (2022.01)
   *G06V 40/10* (2022.01)
   *G06V 40/16* (2022.01)

(52) U.S. Cl.
   CPC ............ *G06V 20/20* (2022.01); *G06V 40/107* (2022.01); *G06V 40/161* (2022.01); *G06V 40/171* (2022.01); *G06V 40/174* (2022.01); *G06V 40/28* (2022.01); *G06T 2219/2016* (2013.01)

(56) References Cited

U.S. PATENT DOCUMENTS

| | | | |
|---|---|---|---|
| 9,968,176 | B2 | 5/2018 | Tomita et al. |
| 10,068,374 | B2 | 9/2018 | Miller et al. |
| 10,310,616 | B2 | 6/2019 | Rose et al. |
| 10,599,920 | B2 | 3/2020 | Mojaver |
| 10,620,700 | B2 | 4/2020 | Publicover et al. |
| 2012/0223956 | A1* | 9/2012 | Saito et al. ............. G09G 5/00 |
| 2014/0104168 | A1* | 4/2014 | Hegde .................... G06F 3/033 |
| 2017/0032577 | A1 | 2/2017 | Smith et al. |
| 2017/0103440 | A1 | 4/2017 | Xing et al. |
| 2018/0075523 | A1* | 3/2018 | Sartori Odizzio et al. ................. G06Q 30/0643 |
| 2019/0246065 | A1* | 8/2019 | Lee et al. ............... H04N 7/147 |
| 2019/0297271 | A1 | 9/2019 | Tomita |

FOREIGN PATENT DOCUMENTS

| | | |
|---|---|---|
| EP | 3 540 569 A1 | 9/2019 |
| JP | 2016-192151 A | 11/2016 |
| WO | 2016/112346 A1 | 7/2016 |
| WO | 2020/104990 A1 | 5/2020 |

OTHER PUBLICATIONS

"Virtual Wardrobe with Gesture-Control System | Virtual Closet;" https://www.youtube.com/watch?reload=9&v=DC_O8S5xHqM; Jan. 2016; pp. 1.

"Best selfie apps for all phones;" https://economictimes.indiatimes.com/tech-life/best-selfie-appsfor-all-phones/cammeios/slideshow/47119403.cms; May 2015; pp. 1-7.

"Smart Beauty Mirrors: AR and AI to Replace Makeup Testers;" https://www.banuba.com/blog/smart-beauty-mirrors-ar-and-aito-replace-makeup-testers; Jun. 2020; pp. 1-12.

"How Hand Gesture Recognition Benefits Different Industries;" https://www.banuba.com/blog/how-hand-gesture-recognitionbenefits-different-industries; May 2020; pp. 1-11.

"Virtual Frame;" https://www.youtube.com/watch?v=i-V3JRqWo7c; Nov. 2015; pp. 1.

"FXMirror_3D Virtual Fitting Solution;" https://www.youtube.com/watch?v=nWcGhuX6N7w; Feb. 2015; pp. 1.

"Virtual Dressing Room—Coitor It Tech;" https://www.youtube.com/watch?v=BD4TCfECxsU; Mar. 2014; pp. 1.

"Virtual Change Room Launch At Robina Town Centre;" https://www.youtube.com/watch?v=1QqP4pFFuv4; Mar. 15; pp. 1.

"Panasonic Smart Mirror—Experiment New Look, Makeup, Hair Virtually;" https://www.youtube.com/watch?v=cu2W4NZkVEc; Jan. 2015; pp. 1.

"Virtual Fitting Room By Fitting Reality;" https://www.youtube.com/watch?v=RCM0u2tBI5E; Sep. 2011; pp. 1.

"TryON Fabrics Magic Mirror From Textronics;" https://www.youtube.com/watch?v=goX-Nub09u8; Nov. 2018; pp. 1.

* cited by examiner

SYSTEM AND METHOD FOR NAVIGATING USER INTERFACES USING A HYBRID TOUCHLESS CONTROL MECHANISM

CROSS-REFERENCE TO RELATED APPLICATION

This application claims priority to, and the benefit of, U.S. Provisional Patent Application entitled, "Hybrid floating hand gesture control mechanism for selfie application," having Ser. No. 63/048,703, filed on Jul. 7, 2020, which is incorporated by reference in its entirety.

TECHNICAL FIELD

The present disclosure generally relates to touchless control of user interfaces and more particularly, to a system and method for navigating user interfaces using a hybrid touchless control mechanism.

BACKGROUND

As part of social distancing measures during the COVID-19 pandemic, health experts have recommended that people avoid hugging and shaking hands in order to reduce the likelihood of transmission. A great deal of effort has also been placed on cleaning and disinfecting high-touch surfaces found in public spaces. These surfaces may be found, for example, on electronic equipment utilized by multiple individuals. Such electronic equipment may include, for example, a makeup kiosk located in a retail establishment where individuals experience virtual application of makeup effects by interacting with the makeup kiosk. As it is preferable to avoid direct contact with high-touch surfaces when possible, there is a need for an improved mechanism for utilizing electronic devices shared by multiple individuals.

SUMMARY

In accordance with one embodiment, a computing device for navigating a user interface using a hybrid touchless control mechanism captures, by a camera, a live video of a user and determines a location of a facial region of the user. The computing device determines a location of the user's hand and determines a finger vector type based on a direction in which at least one finger is pointing relative to the facial region of the user. Responsive to detecting a first finger vector type within the facial region involving a single finger, the computing device displays a makeup effects toolbar in the user interface. Responsive to detecting a second finger vector type involving the single finger, the computing device displays a selection tool for selecting a makeup effect in the makeup effects toolbar. The computing device obtains a selected makeup effect based on manipulation by the user of the selection tool. Responsive to detecting a target user action, the computing device performs virtual application of the selected makeup effect on the facial region of the user.

Another embodiment is a system for navigating a user interface using a hybrid touchless control mechanism that comprises a memory storing instructions and a processor coupled to the memory. The processor is configured by the instructions to capture, by a camera, a live video of a user and determine a location of a facial region of the user. The processor determines a location of the user's hand and determines a finger vector type based on a direction in which at least one finger is pointing relative to the facial region of the user. Responsive to detecting a first finger vector type within the facial region involving a single finger, the processor displays a makeup effects toolbar in the user interface. Responsive to detecting a second finger vector type involving the single finger, the processor displays a selection tool for selecting a makeup effect in the makeup effects toolbar. The processor obtains a selected makeup effect based on manipulation by the user of the selection tool. Responsive to detecting a target user action, the processor performs virtual application of the selected makeup effect on the facial region of the user.

Another embodiment is a non-transitory computer-readable storage medium storing instructions to be implemented by a computing device for navigating a user interface using a hybrid touchless control mechanism. The computing device comprises a processor, wherein the instructions, when executed by the processor, cause the computing device to capture, by a camera, a live video of a user and determine a location of a facial region of the user. The processor determines a location of the user's hand and determines a finger vector type based on a direction in which at least one finger is pointing relative to the facial region of the user. Responsive to detecting a first finger vector type within the facial region involving a single finger, the processor displays a makeup effects toolbar in the user interface. Responsive to detecting a second finger vector type involving the single finger, the processor displays a selection tool for selecting a makeup effect in the makeup effects toolbar. The processor obtains a selected makeup effect based on manipulation by the user of the selection tool. Responsive to detecting a target user action, the processor performs virtual application of the selected makeup effect on the facial region of the user.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Various aspects of the disclosure can be better understood with reference to the following drawings. The components in the drawings are not necessarily to scale, with emphasis instead being placed upon clearly illustrating the principles of the present disclosure. Moreover, in the drawings, like reference numerals designate corresponding parts throughout the several views.

DETAILED DESCRIPTION

A description of a system for implementing a hybrid touchless control mechanism for navigating user interfaces is described followed by a discussion of the operation of the components within the system. In particular, embodiments are disclosed for hybrid touchless control utilizing a combination of finger vector based control, facial expressions, and gestures or actions to allow users to navigate user interfaces without the need for an input device such a mouse or touchscreen interface.

Figure 1:
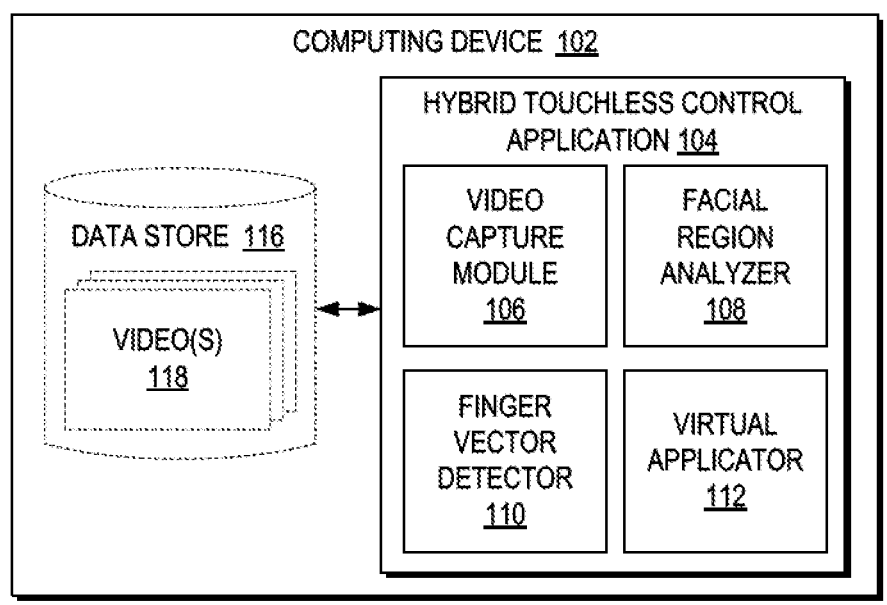
FIG. 1 is a block diagram of a computing device for a hybrid touchless control mechanism for navigating user interfaces according to various embodiments of the present disclosure.

FIG. 1 is a block diagram of a computing device 102 in which the embodiments disclosed herein may be implemented. The computing device 102 may be embodied as a computing device such as, but not limited to, a smartphone, a tablet computing device, a laptop, and so on. A hybrid touchless control application 104 executes on a processor of the computing device 102 and includes a video capture module 106, a facial region analyzer 108, a finger vector detector 110, and a virtual applicator 112.

The video capture module 106 is configured to obtain a live video 118 of the user using, for example, a front facing camera on the computing device 102 and store the video 118 in a data store 116. The video 118 stored in the data store 116 may be encoded in formats including, but not limited to, Motion Picture Experts Group (MPEG)-1, MPEG-2, MPEG-4, H.264, Third Generation Partnership Project (3GPP), 3GPP-2, Standard-Definition Video (SD-Video), High-Definition Video (HD-Video), Digital Versatile Disc (DVD) multimedia, Video Compact Disc (VCD) multimedia, High-Definition Digital Versatile Disc (HD-DVD) multimedia, Digital Television Video/High-definition Digital Television (DTV/HDTV) multimedia, Audio Video Interleave (AVI), Digital Video (DV), QuickTime (QT) file, Windows Media Video (WMV), Advanced System Format (ASF), Real Media (RM), Flash Media (FLV), an MPEG Audio Layer III (MP3), an MPEG Audio Layer II (MP2), Waveform Audio Format (WAV), Windows Media Audio (WMA), 360 degree video, 3D scan model, or any number of other digital formats.

The facial region analyzer 108 is configured to process the live video of the user and track the facial region of the user. A user interface displays the live video of the user and allows the user to apply makeup effects to the facial region of the user. The finger vector detector 110 is configured to determine the location of the user's hand and determine a finger vector type based on a direction in which one or more of the user's fingers are pointing relative to the facial region of the user. As described in more detail below, the facial region analyzer 108 determines such parameters as the finger vector type, the number of fingers being utilized by the user, the location where the finger vector occurs (e.g., inside versus outside the facial region of the user) to determine which operations to execute in the user interface.

In response to detecting the occurrence of a first finger vector type within the facial region involving a single finger, finger vector detector 110 displays a makeup effects toolbar in the user interface. In response to detecting the occurrence of a second finger vector type involving the single finger, the finger vector detector 110 displays a selection tool for selecting a makeup effect in the makeup effects toolbar. The finger vector detector 110 obtains a selection of the one of the makeup effects based on manipulation by the user of the selection tool. The facial region analyzer 108 monitors for the occurrence of a target user action. In response to detecting the occurrence of a target user action, the virtual applicator 112 performs virtual application of the selected makeup effect on the facial region of the user.

Figure 2:
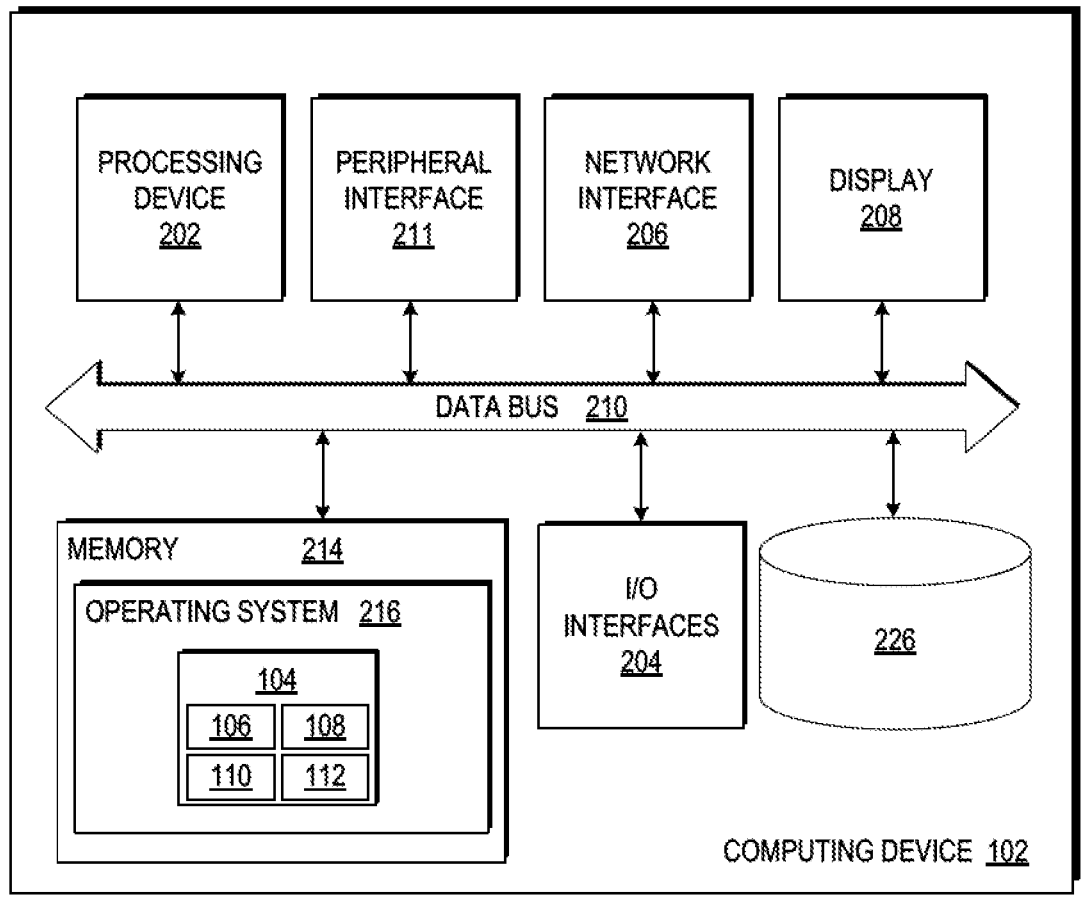
FIG. 2 is a schematic diagram of the computing device of FIG. 1 in accordance with various embodiments of the present disclosure.

FIG. 2 illustrates a schematic block diagram of the computing device 102 in FIG. 1. The computing device 102 may be embodied as a desktop computer, portable computer, dedicated server computer, multiprocessor computing device, smart phone, tablet, and so forth. As shown in FIG. 2, the computing device 102 comprises memory 214, a processing device 202, a number of input/output interfaces 204, a network interface 206, a display 208, a peripheral interface 211, and mass storage 226, wherein each of these components are connected across a local data bus 210.

The processing device 202 may include a custom made processor, a central processing unit (CPU), or an auxiliary processor among several processors associated with the computing device 102, a semiconductor based microprocessor (in the form of a microchip), a macroprocessor, one or more application specific integrated circuits (ASICs), a plurality of suitably configured digital logic gates, and so forth.

The memory 214 may include one or a combination of volatile memory elements (e.g., random-access memory (RAM, such as DRAM, and SRAM, etc.)) and nonvolatile memory elements (e.g., ROM, hard drive, tape, CDROM, etc.). The memory 214 typically comprises a native operating system 216, one or more native applications, emulation systems, or emulated applications for any of a variety of operating systems and/or emulated hardware platforms, emulated operating systems, etc. For example, the applications may include application specific software which may comprise some or all the components of the computing device 102 displayed in FIG. 1.

In accordance with such embodiments, the components are stored in memory 214 and executed by the processing device 202, thereby causing the processing device 202 to perform the operations/functions disclosed herein. For some embodiments, the components in the computing device 102 may be implemented by hardware and/or software.

Input/output interfaces 204 provide interfaces for the input and output of data. For example, where the computing device 102 comprises a personal computer, these components may interface with one or more user input/output interfaces 204, which may comprise a keyboard or a mouse, as shown in FIG. 2. The display 208 may comprise a computer monitor, a plasma screen for a PC, a liquid crystal display (LCD) on a hand held device, a touchscreen, or other display device.

In the context of this disclosure, a non-transitory computer-readable medium stores programs for use by or in connection with an instruction execution system, apparatus, or device. More specific examples of a computer-readable medium may include by way of example and without limitation: a portable computer diskette, a random access memory (RAM), a read-only memory (ROM), an erasable programmable read-only memory (EPROM, EEPROM, or Flash memory), and a portable compact disc read-only memory (CDROM) (optical).

Figure 3:
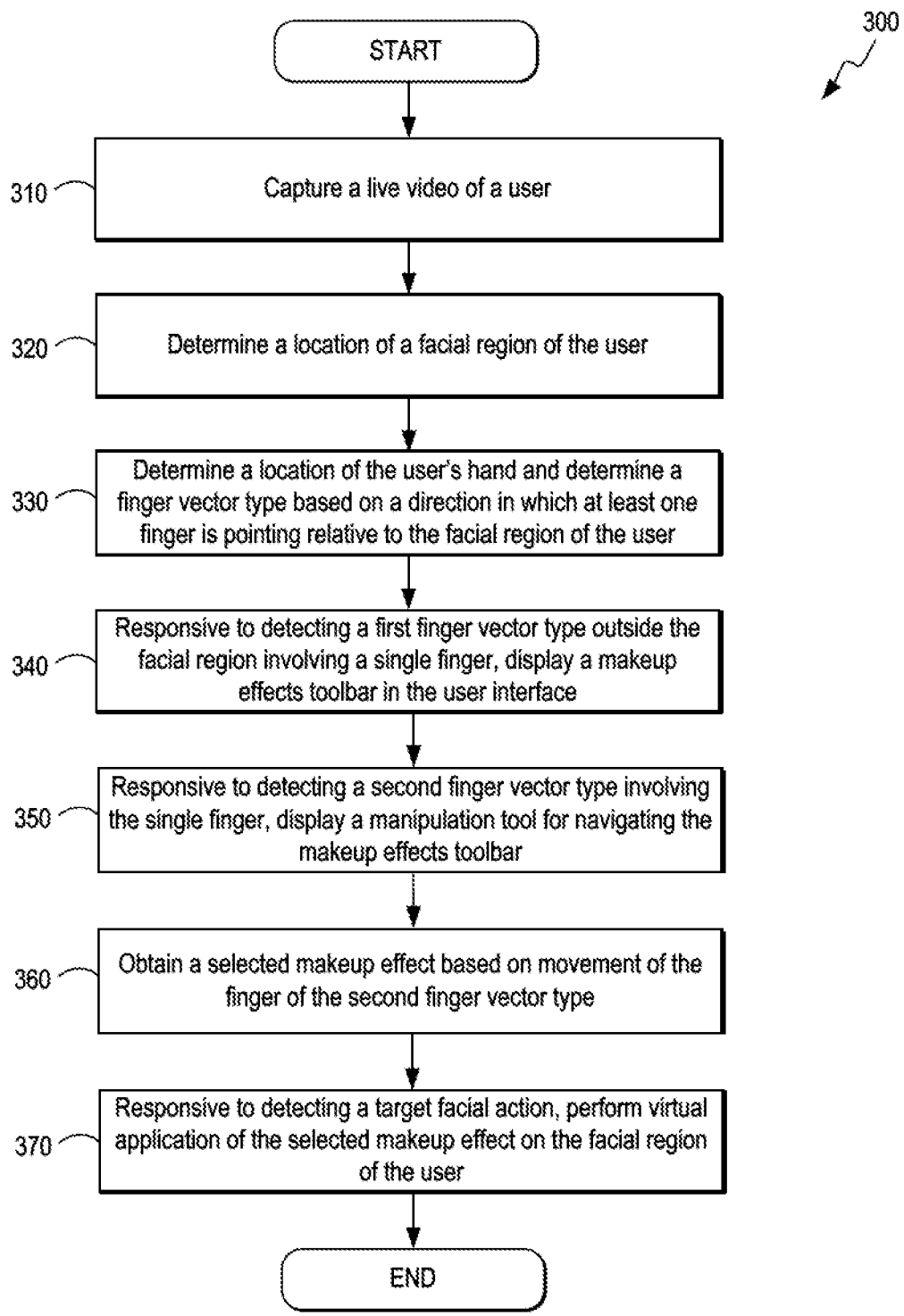
FIG. 3 is a top-level flowchart illustrating examples of functionality implemented as portions of the computing device of FIG. 1 for implementing a hybrid touchless control mechanism for navigating user interfaces according to various embodiments of the present disclosure.

Reference is made to FIG. 3, which is a flowchart 300 in accordance with various embodiments for implementing a hybrid touchless control mechanism for navigating user interfaces, where the operations are performed by the computing device 102 of FIG. 1. It is understood that the flowchart 300 of FIG. 3 provides merely an example of the different types of functional arrangements that may be employed to implement the operation of the various components of the computing device 102. As an alternative, the flowchart 300 of FIG. 3 may be viewed as depicting an example of steps of a method implemented in the computing device 102 according to one or more embodiments.

Although the flowchart 300 of FIG. 3 shows a specific order of execution, it is understood that the order of execution may differ from that which is displayed. For example, the order of execution of two or more blocks may be scrambled relative to the order shown. Also, two or more blocks shown in succession in FIG. 3 may be executed concurrently or with partial concurrence. It is understood that all such variations are within the scope of the present disclosure.

At block 310, the computing device 102 captures a live video of a user using a camera. At block 320, the computing device 102 determines a location of a facial region of the user. At block 330, the computing device 102 determines a location of the user's hand and determines a finger vector type based on a direction in which at least one finger is pointing relative to the facial region of the user.

At block 340, the computing device 102 displays a makeup effects toolbar in the user interface in response to the occurrence of a first finger vector type within the facial region involving a single finger. For some embodiments, the first finger vector type within the facial region involving the single finger comprises an inward finger vector type corresponding to a single finger pointing towards a facial feature in the facial region of the user, and the makeup effects toolbar displayed in the user interface corresponds to makeup effects for the facial feature in the facial region that the single finger is pointing to. For some embodiments, the second finger vector type comprises an outward finger vector type corresponding to the at least one finger pointing away the facial region of the user.

For some embodiments, the facial region analyzer 108 (FIG. 1) differentiates between finger vector types by first identifying feature points in the facial region of the user. The finger vector detector 110 (FIG. 1) detects a hand landmark feature and determines the direction and the area that an index finger points to. The finger vector detector 110 calculates an overlap area between the area that the finger is pointing to and the area occupied by the facial feature points. Based on this, the finger vector detector 110 determines whether the index finger points to a facial feature area of interest such as the lips or eyes. If the overlap area matches a predetermined facial feature, then the finger vector detector 110 determines that the finger vector type is an inward finger vector. If no facial feature is found in the overlap area, the finger vector detector 110 calculates the direction that the index finger is pointing to in order to determine whether any user interface widget is found in that direction, and the finger vector detector 110 determines that the finger vector type is an outward finger vector.

At block 350, the computing device 102 displays a selection tool for selecting a makeup effect in the makeup effects toolbar in response to the occurrence of a second finger vector type involving the single finger. At block 360, the computing device 102 obtains a selected makeup effect based on manipulation by the user of the selection tool.

At block 370, the computing device 102 performs virtual application of the selected makeup effect on the facial region of the user in response to detecting the occurrence of a target user action. The target user action may comprise, for example, a target facial expression, eyes blinking, the user's head nodding, or the user shaking her head side to side. Where the target user action comprises eyes blinking, the target user action may specifically comprise the user's eyes blinking a predetermined number of times in succession.

For some embodiments, the facial region analyzer 108 detects blinking eyes by identifying features points of the eyes and counting the number of times that changes to these feature points occur over a period of time to determine whether the eyes are blinking. For some embodiments, the facial region analyzer 108 detects that the user's head is nodding by locating two-dimensional (2D) feature points of the facial area of the user. The facial region analyzer 108 then maps the 2D feature points to a three-dimensional (3D) model and monitors movement of the feature points on the 3D model to calculate the movement in the pitch, roll, and yaw directions. The facial region analyzer 108 determines that the user's head is nodding based on whether the movement in a particular direction (e.g., pitch motion) changes a threshold number of times within a period of time. Similarly, the facial region analyzer 108 determines that the user's head is shaking based on whether the movement in a particular direction (e.g., yaw motion) changes a threshold number of times within a period of time. For some embodiments, virtual application of the selected makeup effect on the facial region of the user is performed responsive to a second occurrence of the second finger vector type combined with a palm of the user's hand moving toward the computing device.

For some embodiments, the computing device 102 allows the user to zoom in or out of the facial region. In particular, the computing device 102 monitors for the occurrence of a first finger vector type involving a plurality of fingers within the facial region. In response to detecting the occurrence of a first finger vector type involving a plurality of fingers within the facial region, the computing device zooms in on the facial region as the plurality of fingers move apart from one another and zooms out on the facial region as the plurality of fingers move toward one another. Thereafter, the process in FIG. 3 ends.

Figure 4:
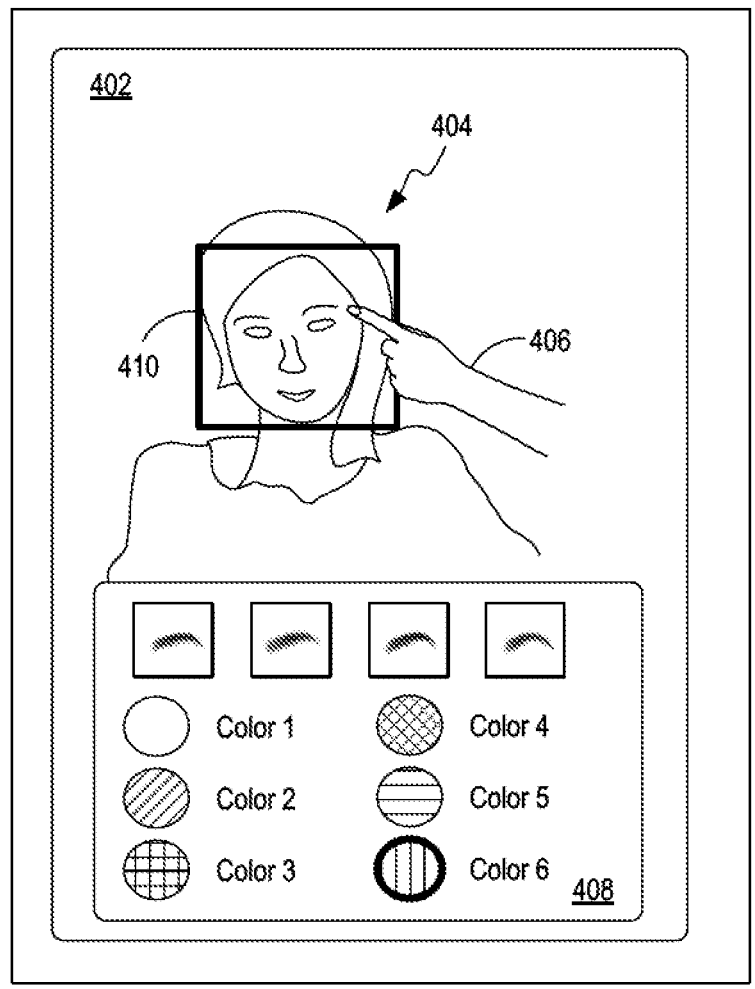
FIG. 4 illustrates the user performing a first finger vector type within the facial region using a single finger according to various embodiments of the present disclosure.

To further illustrate various aspects of the present invention, reference is made to the following figures. FIG. 4 illustrates the user performing a hand gesture 406 comprising a first finger vector type within the facial region 404 of the user using a single finger. As shown, the user performs a first finger vector type to display a makeup toolbar 408 in the user interface 402 where at least a portion of the user's hand is located in the facial region 404. In particular, the first finger vector type comprises an inward finger vector type corresponding to a single finger pointing towards a specific facial feature within the facial region 404 of the user.

The makeup toolbar 408 displayed in the user interface 402 corresponds to makeup effects for the facial feature in the facial region 404 that the single finger is pointing to. For some embodiments, a bounding box 410 is displayed around the facial region 404 to guide the user when the user is performing a finger vector type. When at least a portion of the user's finger enters the region defined by the bounding box 410, this causes the finger vector detector 110 in the computing device 102 of FIG. 1 to determine the finger vector type.

Figure 5:
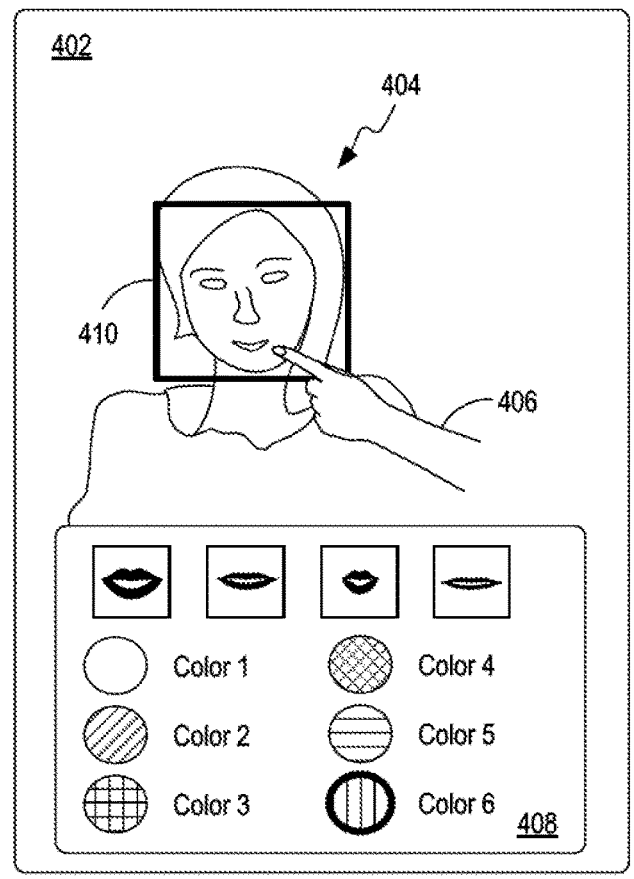
FIG. 5 shows examples of makeup toolbars for other facial features according to various embodiments of the present disclosure.
Figure 5:
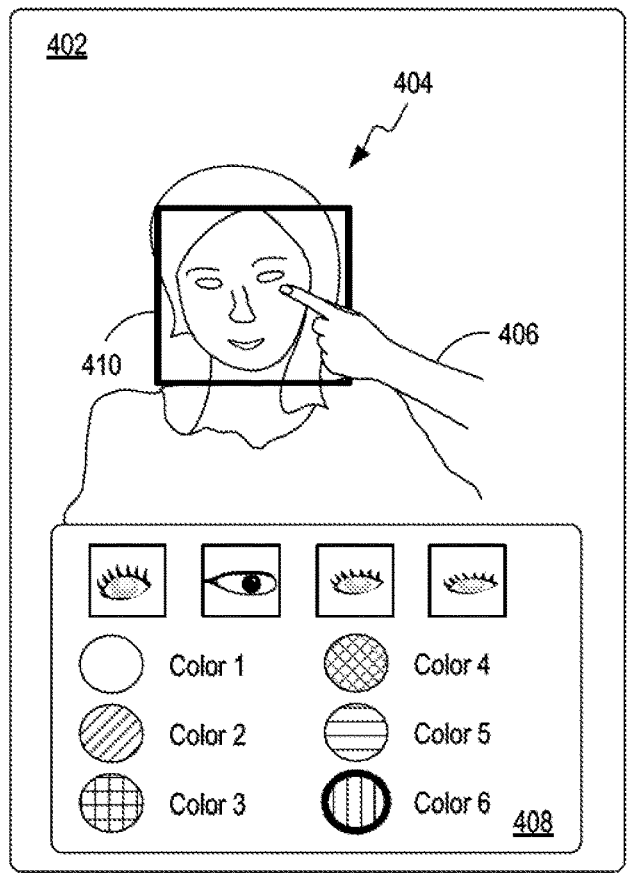

In the example shown in FIG. 4, the user performs an inward finger vector type and points to an eyebrow in the facial region 404, thereby causing a makeup toolbar 408 with various selectable eyebrow makeup effects to be displayed in the user interface 402. FIG. 5 shows examples of makeup toolbars 408 for other facial features. In the first example shown, the user performs an inward finger vector type that points to the user's lips, thereby causing a makeup toolbar 408 with various selectable lipstick makeup effects to be displayed in the user interface 402. In the second example shown, the user performs an inward finger vector type that points to an eye in the facial region 404, thereby causing a makeup toolbar 408 with various selectable eyeshadow effects to be displayed in the user interface 402.

Figure 6:
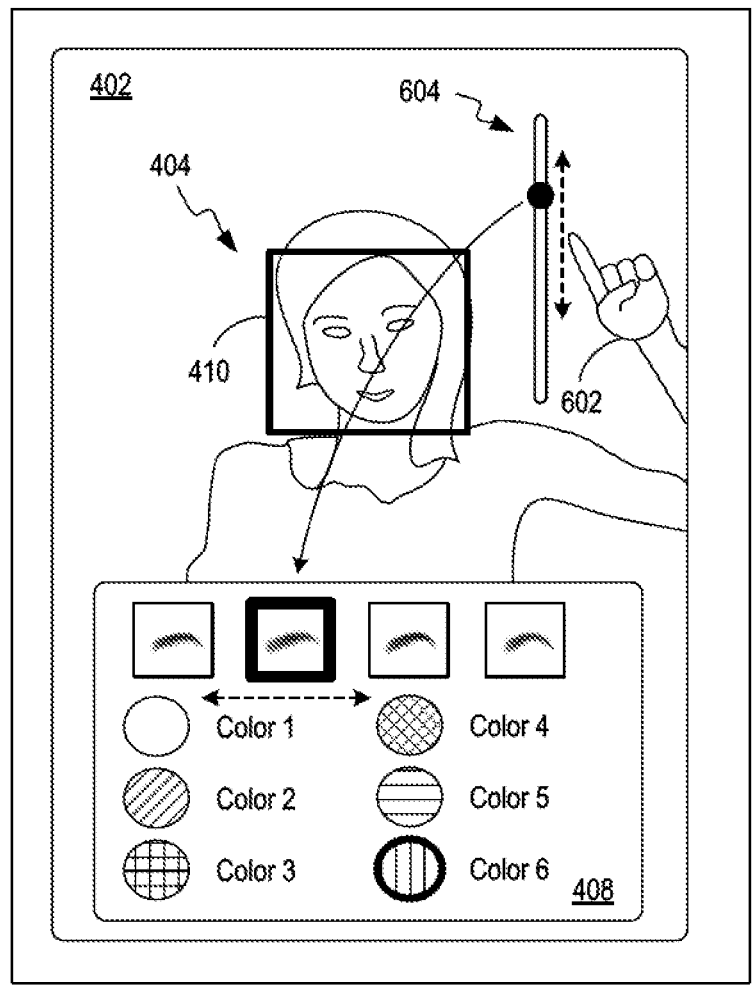
FIG. 6 illustrates the user performing a second finger vector type for selecting a makeup effect according to various embodiments of the present disclosure.

FIG. 6 illustrates the user performing a second finger vector type for selecting a makeup effect. Once a makeup toolbar 408 is displayed in response to the user performing a first finger vector type, the user makes a selection among the effects in the makeup toolbar 408 by performing another finger vector operation. In particular, the user performs a hand gesture 602 corresponding to a second finger vector type. The detection of the second finger vector type causes a selection tool 604 to be displayed. The selection tool 604 allows the user to navigate among the different makeup effects in the makeup toolbar 408 before making a selection.

For some embodiments, the second finger vector type comprises an outward finger vector type corresponding to the user's finger pointing away from the facial region 404 of the user. In this regard, the finger vector detector 110 executing in the computing device 102 (FIG. 1) differentiates between the first finger vector type and the second finger vector type based in part on the direction in which the one or more fingers used for the finger vector type are pointing to. For example, if the user's finger is pointing towards the facial region 404 and at least a portion of the finger is located within the bounding box 410, the finger vector detector 110 determines that the user has performed an inward finger vector type and performs a corresponding operation. If the user's finger is pointing away from the facial region 404, the finger vector detector 110 determines that the user has performed an outward finger vector type and performs a corresponding operation. Referring back to FIG. 6, the occurrence of the second finger vector type in this example causes the selection tool 604 to be displayed, and the user then controls the selection tool 604 using finger movements. The selection tool 604 may comprise a slider or other suitable user interface component for switching between the various selectable makeup effects in the makeup toolbar 408.

Figure 7A:
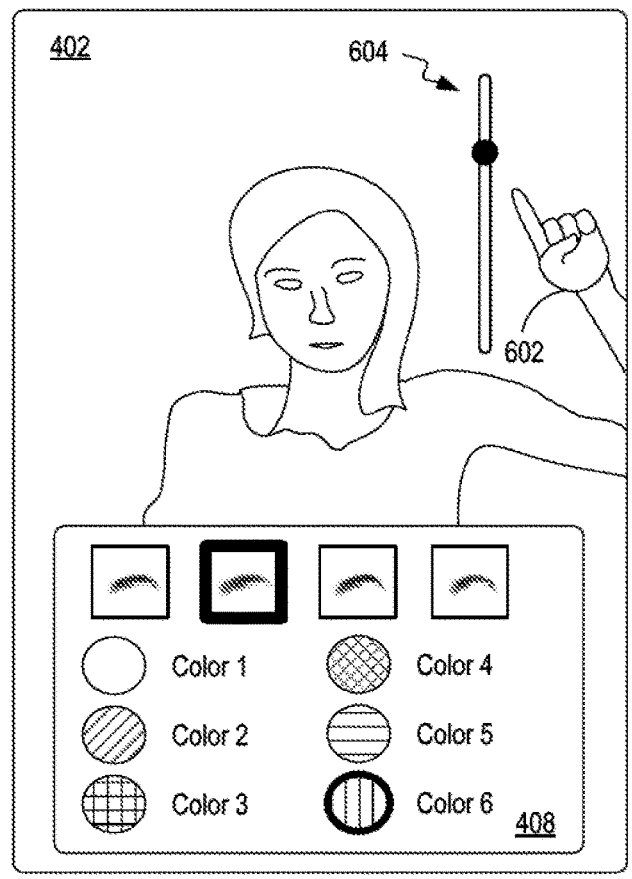
FIGS. 7A and 7B illustrate how the user confirms selection of a makeup effect in the makeup toolbar according to various embodiments of the present disclosure.
Figure 7B:
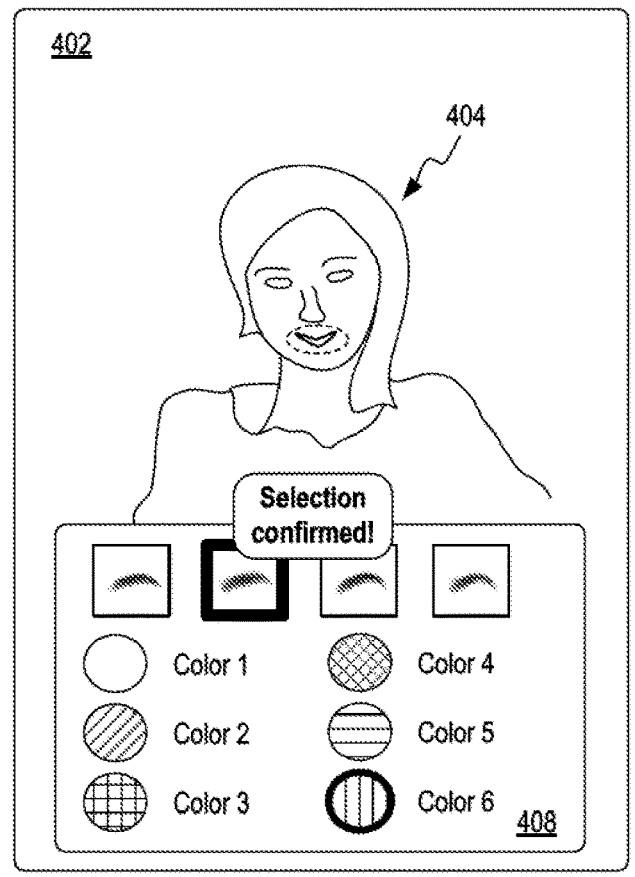

FIGS. 7A and 7B illustrate how the user confirms selection of a makeup effect in the makeup toolbar. FIG. 7A illustrates the user using a hand gesture 602 to make a selection among the makeup effects in the makeup toolbar 408 using the selection tool 604. To confirm or enter the selection, the user may perform any of a number of pre-defined target actions or gestures.

The target actions may comprise, for example, a target facial expression, the user blinking her eyes, the user nodding her head, or the user shaking her head side to side. The target action may also comprise the user performing a second finger vector type combined with a palm of the user's hand moving toward the computing device. In the example shown in FIG. 7B, the user confirms the selection of the makeup effect by performing a target facial expression (i.e., smiling at the front facing camera). Upon confirmation of the makeup effect selection, the virtual applicator 112 (FIG. 1) performs virtual application of the selected makeup effect on the facial region 404 of the user.

Figure 8:
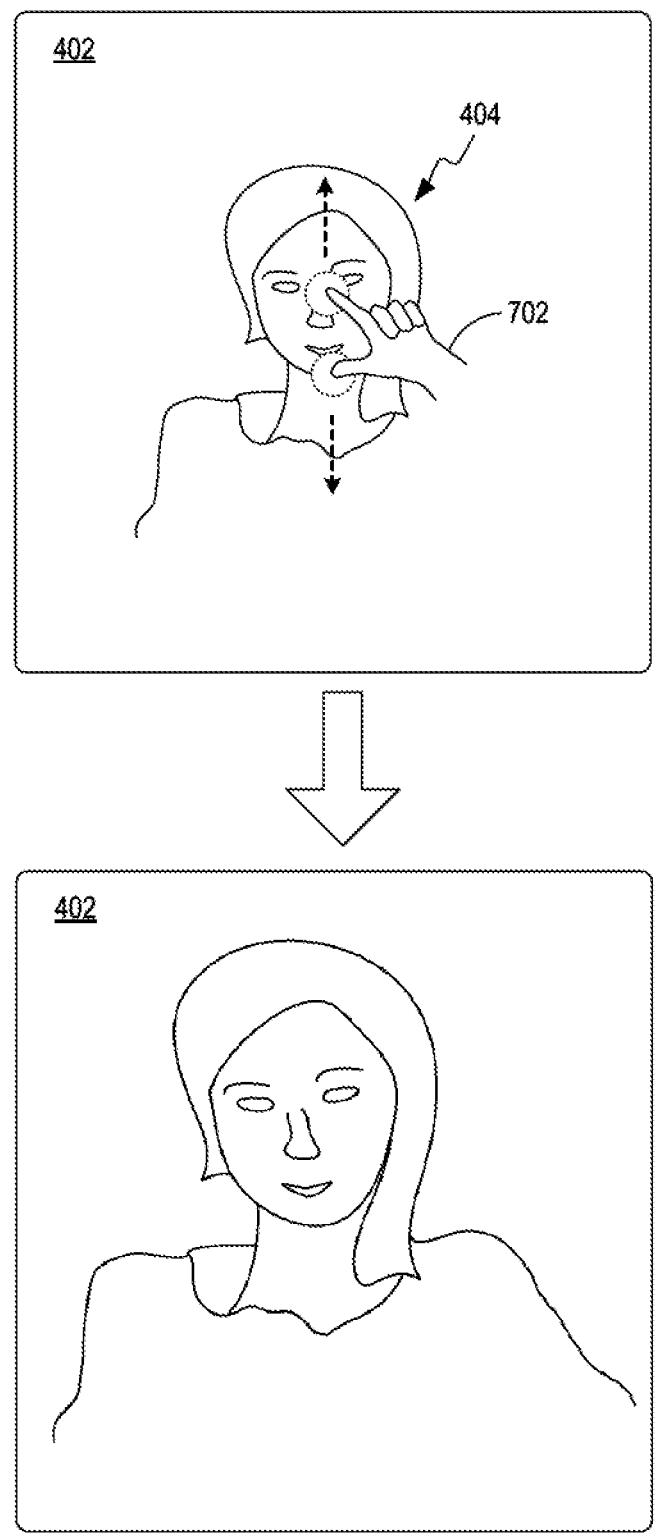
FIG. 8 illustrates use of a first finger vector type involving a plurality of fingers within the facial region to zoom in and out of the facial region according to various embodiments of the present disclosure.

FIG. 8 illustrates use of a first finger vector type involving a plurality of fingers within the facial region to zoom in and out of the facial region. To zoom in and out of the facial region 404, the user performs a hand gesture 702 comprising a first finger vector type within the facial region 404. In particular, the user moves the fingers apart to zoom into the facial region 404 and moves the fingers together to zoom away from the facial region 404.

Figure 9:
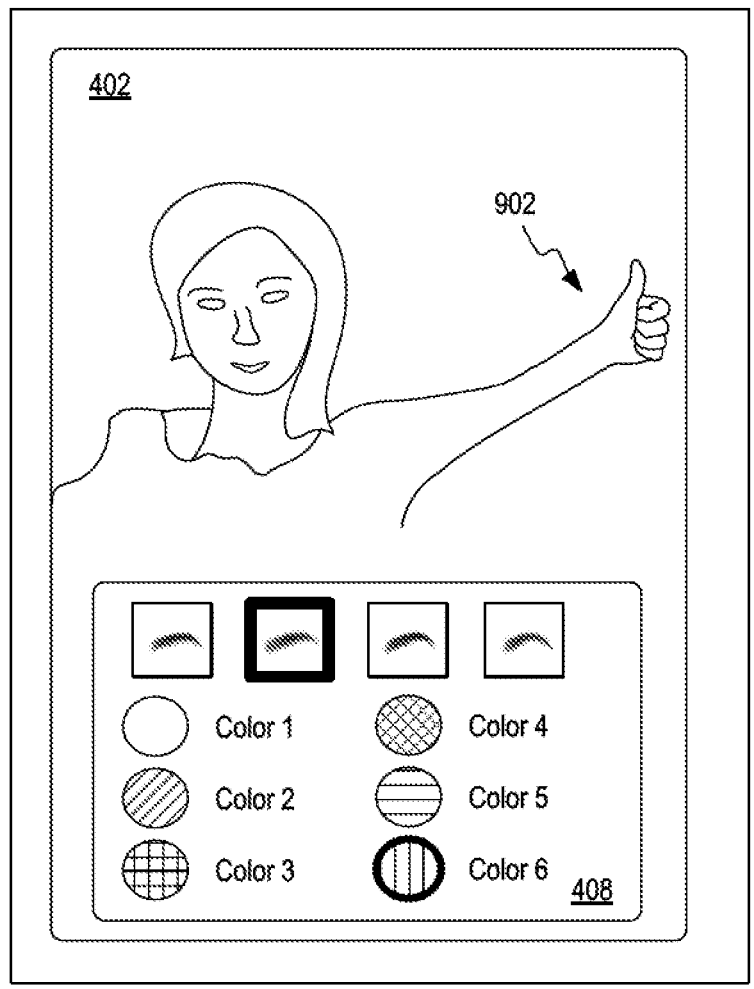
FIG. 9 illustrates an example of a target user action for initiating the virtual application of a selected makeup effect on the facial region according to various embodiments of the present disclosure.
Figure 10:
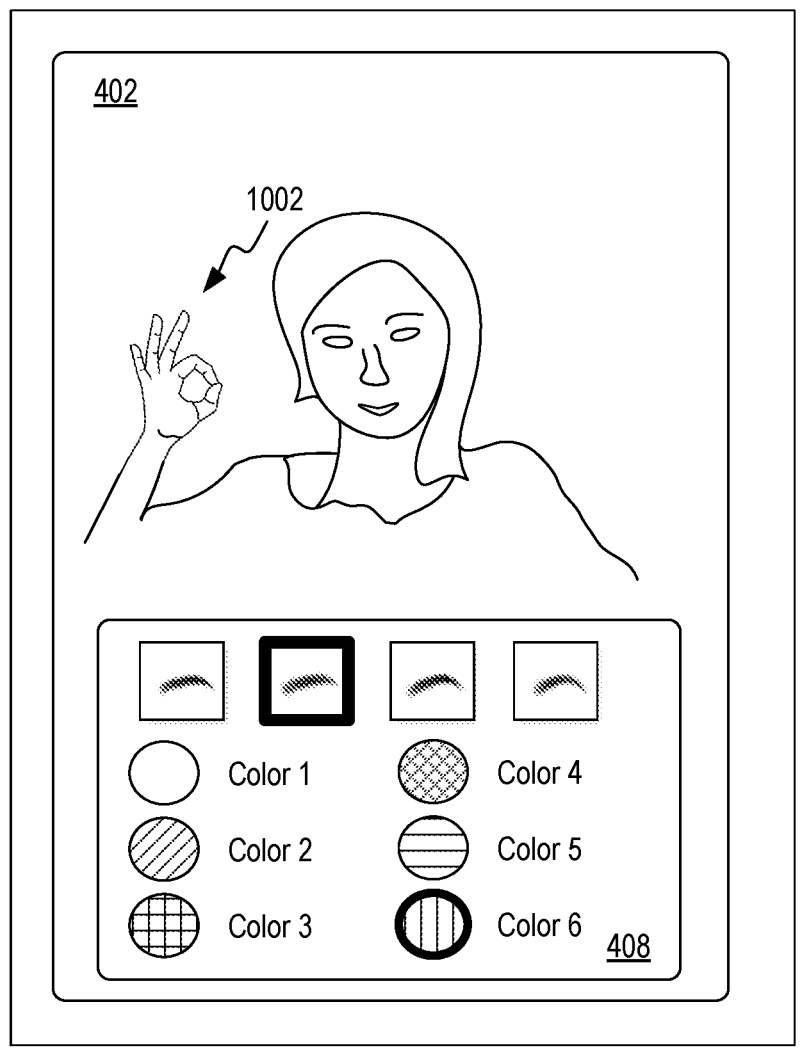
FIG. 10 illustrates another example of a target user action for initiating the virtual application of a selected makeup effect on the facial region according to various embodiments of the present disclosure.
Figure 11:
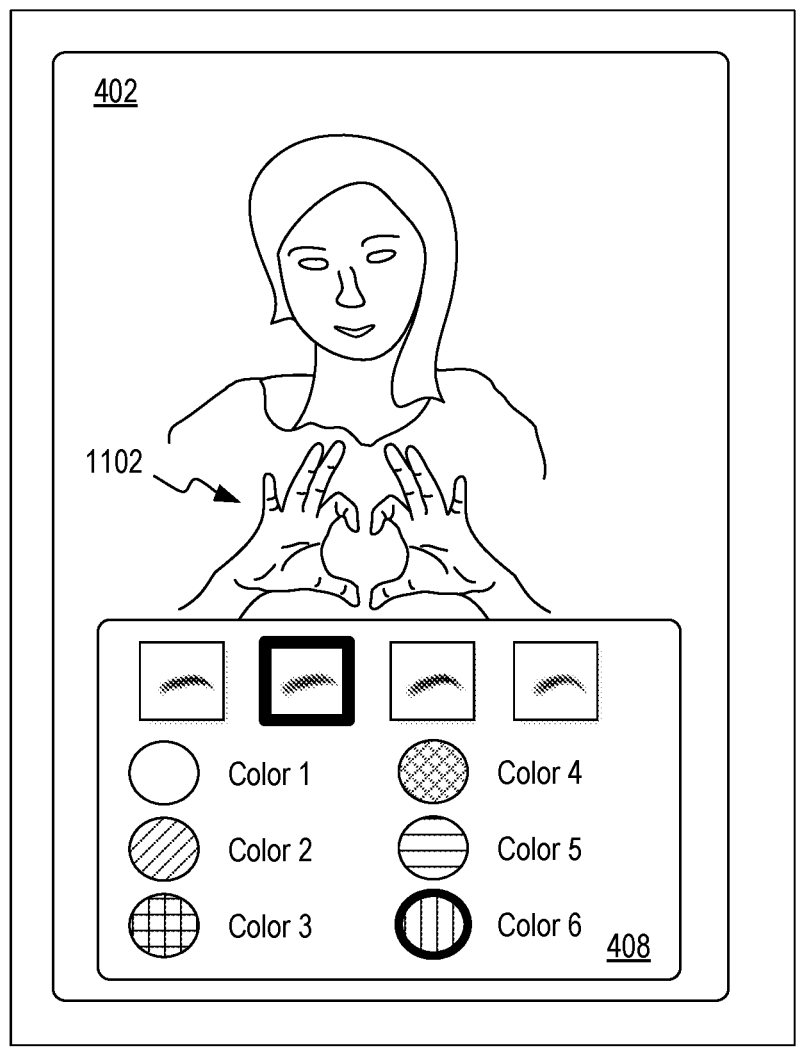
FIG. 11 illustrates another example of a target user action for initiating the virtual application of a selected makeup effect on the facial region according to various embodiments of the present disclosure.
Figure 12:
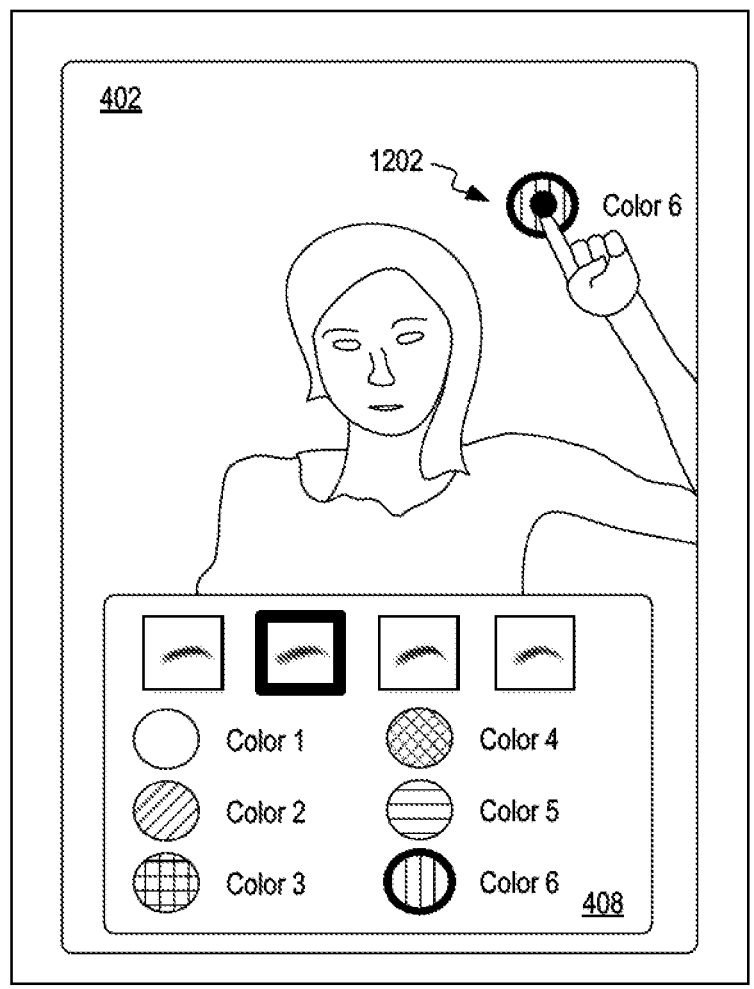
FIG. 12 illustrates another example of a target user action for initiating the virtual application of a selected makeup effect on the facial region according to various embodiments of the present disclosure.

FIGS. 9-12 illustrate various examples of target user actions performed by the user for initiating the virtual application of a selected makeup effect on the facial region according to various embodiments of the present disclosure. FIG. 9 illustrates a target user action 902 comprising a thumbs up hand gesture performed by the user to initiate virtual application of the selected makeup effect. FIG. 10 illustrates a target user action 1002 comprising an okay hand gesture performed by the user to initiate virtual application of the selected makeup effect. FIG. 11 illustrates a target user action 1102 comprising a hand gesture involving the formation of a heart shape with the user's fingers to initiate virtual application of the selected makeup effect. FIG. 12 illustrates a target user action 1202 comprising placement of a finger on a makeup effect for a predetermined period of time to initiate virtual application of the selected makeup effect. The finger vector detector 110 (FIG. 1) detects placement of a finger on a makeup effect by identifying a hand landmark feature and obtaining the direction and area that an index finger is pointing to. The finger vector detector 110 calculates an overlap area between a region in the user interface and an area occupied by the index finger. The finger vector detector 110 determines whether the index finger points to the makeup effect toolbar. Other examples of target user actions include a heart finger sign gesture, voice input, and a kissing gesture performed by the user. The facial region analyzer 108 detects a kissing gesture by identifying feature points in the mouth region of the user's face and connecting these feature points to define a closed polygon. The facial region analyzer 108 then detects a kissing gesture by sensing whether the polygon transforms to a circular shape within a threshold period of time.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

At least the following is claimed:

1. A method implemented in a computing device for navigating a user interface using a hybrid touchless control mechanism, comprising:
   capturing, by a camera, a live video of a user;
   determining a location of a facial region of the user in the live video;
   determining a location of the user's hand in the live video and determining a finger vector type based on a direction in which at least one finger is pointing relative to the facial region of the user in the live video;
   responsive to detecting in the live video a first finger vector type occurring within the facial region involving a single finger, displaying a makeup effects toolbar in the user interface;
   responsive to detecting in the live video a second finger vector type involving the single finger, displaying a selection tool for selecting a makeup effect in the makeup effects toolbar;
   obtaining a selected makeup effect based on manipulation by the user of the selection tool; and
   responsive to detecting a target user action, performing virtual application of the selected makeup effect on the facial region of the user.

2. The method of claim 1, wherein the first finger vector type within the facial region involving the single finger comprises an inward finger vector type corresponding to a single finger pointing towards a facial feature in the facial region of the user, and wherein the makeup effects toolbar displayed in the user interface corresponds to makeup effects for the facial feature in the facial region that the single finger is pointing to.

3. The method of claim 1, wherein the second finger vector type comprises an outward finger vector type corresponding to the at least one finger pointing towards the makeup effects toolbar.

4. The method of claim 1, wherein the target user action comprises one of: a target facial expression, eyes blinking, the user's head nodding, the user's head shaking side to side, or the user placing a finger over a makeup effect in the makeup effects toolbar.

5. The method of claim 4, wherein the target user action comprises eyes blinking a predetermined number of times in succession.

6. The method of claim 1, wherein the target user action comprises one of: placement of a finger on a makeup effect for a predetermined period of time, a thumbs up hand gesture, an okay hand gesture, formation of a heart shape with the user's fingers, a heart finger sign, voice input, a kissing gesture, or user input.

7. The method of claim 1, further comprising:
   responsive to detecting a first finger vector type involving a plurality of fingers within the facial region:
   zooming in on the facial region as the plurality of fingers move apart from each other; and
   zooming out on the facial region as the plurality of fingers move toward each other.

8. The method of claim 1, wherein the virtual application of the selected makeup effect on the facial region of the user is also performed responsive to a second occurrence of the second finger vector type combined with a palm of the user's hand moving toward the computing device.

9. A system for navigating a user interface using a hybrid touchless control mechanism, comprising:
   a memory storing instructions;
   a processor coupled to the memory and configured by the instructions to at least:
   capture, by a camera, a live video of a user;
   determine a location of a facial region of the user in the live video by a facial region analyzer;
   determine a finger vector type by a finger vector detector based on a direction in which at least one finger is pointing relative to the facial region of the user in the live video;
   responsive to detecting in the live video a first finger vector type occurring within the facial region involving a single finger, display a makeup effects toolbar in the user interface;
   responsive to detecting in the live video a second finger vector type involving the single finger, display a selection tool for selecting a makeup effect in the makeup effects toolbar;
   obtain a makeup effect based on manipulation by the user of the selection tool; and
   responsive to detecting a target user action, perform virtual application of the selected makeup effect on the facial region of the user.

10. The system of claim 9, wherein the first finger vector type within the facial region involving the single finger comprises an inward finger vector type corresponding to a single finger pointing towards a facial feature in the facial region of the user, and wherein the makeup effects toolbar displayed in the user interface corresponds to makeup effects for the facial feature in the facial region that the single finger is pointing to.

11. The system of claim 9, wherein the second finger vector type comprises an outward finger vector type corresponding to the at least one finger pointing towards the makeup effects toolbar.

12. The system of claim 9, wherein the target user action comprises one of: a target facial expression, eyes blinking, the user's head nodding, the user's head shaking side to side, or the user placing a finger over a makeup effect in the makeup effects toolbar.

13. The system of claim 12, wherein the target user action comprises eyes blinking a predetermined number of times in succession.

14. The system of claim 9, wherein the target user action comprises one of: placement of a finger on a makeup effect for a predetermined period of time, a thumbs up hand gesture, an okay hand gesture, formation of a heart shape with the user's fingers, a heart finger sign, voice input, a kissing gesture, or user input.

15. The system of claim 9, wherein the processor is further configured to:
   responsive to detecting a first finger vector type involving a plurality of fingers within the facial region:
   zoom in on the facial region as the plurality of fingers move apart from each other; and
   zoom out on the facial region as the plurality of fingers move toward each other.

16. The system of claim 9, wherein the virtual application of the selected makeup effect on the facial region of the user is also performed responsive to a second occurrence of the second finger vector type combined with a palm of the user's hand moving toward the computing device.

17. A non-transitory computer-readable storage medium storing instructions to be implemented by a computing device having a processor for navigating a user interface using a hybrid touchless control mechanism, wherein the instructions, when executed by the processor, cause the computing device to at least:

capture, by a camera, a live video of a user;

determine a location of a facial region of the user in the live video;

determine a finger vector type based on a direction in which at least one finger is pointing relative to the facial region of the user in the live video;

responsive to detecting in the live video a first finger vector type within the facial region involving a single finger, display a makeup effects toolbar in the user interface;

responsive to detecting in the live video a second finger vector type involving the single finger, display a selection tool for selecting a makeup effect in the makeup effects toolbar;

obtain a makeup effect based on manipulation by the user of the selection tool; and responsive to detecting a target user action, perform virtual application of the selected makeup effect on the facial region of the user.

18. The non-transitory computer-readable storage medium of claim 17, wherein the first finger vector type within the facial region involving the single finger comprises an inward finger vector type corresponding to a single finger pointing towards a facial feature in the facial region of the user, and wherein the makeup effects toolbar displayed in the user interface corresponds to makeup effects for the facial feature in the facial region that the single finger is pointing to.

19. The non-transitory computer-readable storage medium of claim 17, wherein the second finger vector type comprises an outward finger vector type corresponding to the at least one finger pointing towards the makeup effects toolbar.

20. The non-transitory computer-readable storage medium of claim 17, wherein the target user action comprises one of: a target facial expression, eyes blinking, the user's head nodding, the user's head shaking side to side, or the user placing a finger over a makeup effect in the makeup effects toolbar.

* * * * *